No. 876,053. PATENTED JAN. 7, 1908.
W. H. HEARD.
SAFETY CLUTCH FOR POWER DRIVING PUMPS.
APPLICATION FILED JULY 11, 1906. RENEWED NOV. 9, 1907.
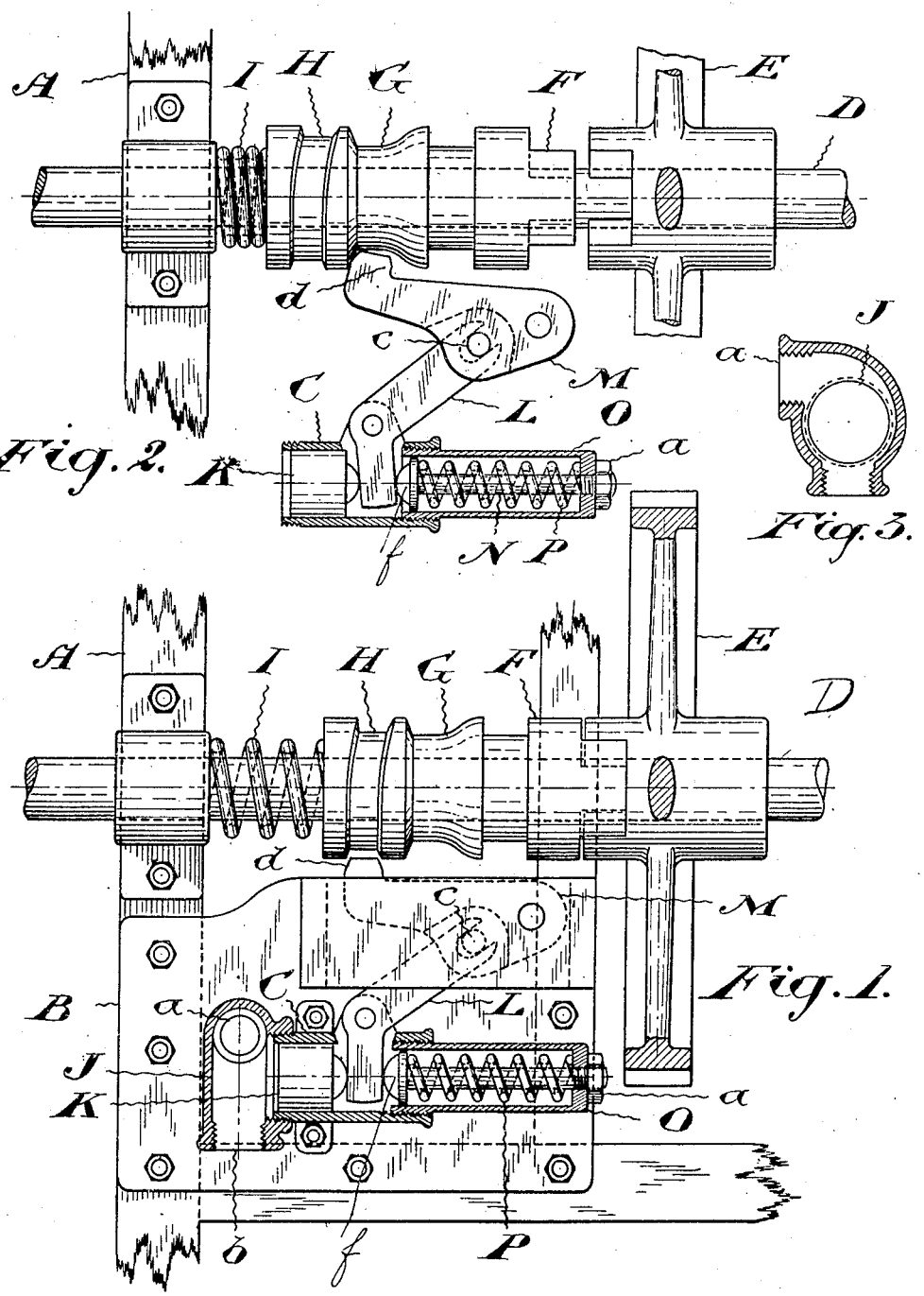
WITNESSES:
INVENTOR.
Wm H. Heard
BY Ridout & Maybee
ATTORNEYS

UNITED STATES PATENT OFFICE.

WILLIAM HENRY HEARD, OF LONDON, ONTARIO, CANADA.

SAFETY-CLUTCH FOR POWER-DRIVING PUMPS.

No. 876,053.  Specification of Letters Patent.  Patented Jan. 7, 1908.

Application filed July 11, 1906, Serial No. 325,609. Renewed November 9, 1907. Serial No. 401,493.

*To all whom it may concern:*

Be it known that I, WILLIAM HENRY HEARD, of the city of London, in the county of Middlesex, Province of Ontario, Canada, have invented certain new and useful Improvements in a Safety-Clutch for Power-Driving Pumps, of which the following is a specification.

My object is to devise means whereby a power driven pump may be automatically regulated to prevent the pressure in pump rising above a predetermined maximum, and my invention consists essentially of a clutch whereby the driving part may be put in gear or out of gear with the driven part and of means whereby increase of pressure in a fluid conduit will throw the clutch out of gear until such time as the pressure decreases, substantially as hereinafter more specifically described and then definitely claimed.

Figure 1 is a plan view of my improved clutch. Fig. 2 is a similar view of part of the same, showing the clutch disengaged. Fig. 3 is a vertical section of the pipe connections for the cylinder.

In the drawings like letters of reference indicate corresponding parts in the different figures.

A is the frame supporting the different parts. D is a shaft or driving member suitably journaled on the frame. This shaft may be driven in any suitable manner. Loose on the shaft is a gear wheel E. On the hub of this gear wheel is formed one half of a clutch. F is the movable clutch member adapted to engage with the part of the clutch formed on the hub of the wheel. The gear wheel when in clutch with the shaft is intended to drive a suitable pump. The movable part of the clutch has a sleeve G formed on or connected therewith, provided with a helical groove H. I is a coil spring normally tending to maintain the clutch in gear.

B is a base plate on which is formed or secured the cylinder C. With this cylinder communicates a conduit J. This conduit when the machine is in operation will be connected by means of a connection $a$ with the pressure side of the pump with which the safety clutch is to be used and by means of the connection $b$ with the spray nozzles, as this device will mostly be used with spray pumps. This pressure generated in the conduit J will enter the cylinder C and will act on a piston K fitted therein. The piston is adapted to engage a lever L of the first order fulcrumed on the cylinder or base plate B. The other end of this lever is forked or otherwise shaped to engage a pin or other part $c$ on the lever M fulcrumed on the frame of the machine. The free end of this lever is provided with a projection $d$ adapted to enter the helical groove H.

N is a stem slidable through the end of a sleeve O screwed into the cylinder C opposite the piston K. The inner end of this stem is adapted to engage the end of the lever L. Its outer end has screwed thereon a nut $a$. Between the end of the sleeve and the head $f$ on the stem is located a coil spring P.

The sleeve O it will be noted may be screwed in or out of the cylinder C. By adjusting the nut $a$ the tension of the spring P may be adjusted and then by screwing the cylinder N the head $f$ on the stem may be brought into proper engagement with the end of the lever L.

The operation of the device is as follows: Any excess of pressure generated in the conduit forces inward the piston against the tension of the spring P, but of course movement does not take place until the pressure exceeds the resistance of the coil spring, and as already stated the resistance of the latter is adjustable, so that the apparatus may be caused to operate at any desired pressure. The movement of the lever L by means of the piston throws up the lever M with its end $d$ in engagement with the helical groove H. As the sleeve in which the groove is formed is connected with the movable half of the clutch, and as the clutch is rotatable with the shaft D, the sleeve is gradually screwed back as the shaft continues its rotation until the parts assume the position shown in Fig. 2. The clutch is then disengaged and the gear wheel from which power is taken ceases to revolve until such time as a decrease of pressure in the conduit withdraws the end $d$ from the groove and allows the parts to again assume the position shown in Fig. 1 when the driving member is again in clutch with the driven member.

This device is particularly adapted for power driven spray pumps of all kinds, as without any attention from the operator the pumping is regulated to at all times maintain a substantial constant pressure without any possibility of excess pressure appearing. The wear and tear on the pump and other parts of the apparatus in which the device is used is thus greatly reduced and all danger of break down from excess pressure avoided. I may use this device either with engine driven or horse power driven pumps. I do not desire, of course, to limit myself to the precise details of the construction shown, as many variations may be made in the means of operating the levers by excess of pressure and the means for causing the levers to operate the clutch.

What I claim as my invention is:—

1. In a device of the class described the combination of a driving member; a driven member; a clutch whereby they may be put into or out of gear with one another; a sleeve rotatable with the driving member connected to the clutch and having a helical groove formed therein; a lever fulcrumed adjacent to the sleeve and adapted to engage the groove therein; a fluid conduit; and means adapted to be controlled by pressure in the conduit for moving the lever into engagement with the said groove, substantially as described.

2. In a device of the class described the combination of a driving member; a driven member; a shifting clutch whereby they may be put into or out of gear with one another; a sleeve rotatable with the driving member connected to the clutch and having a helical groove formed therein; a lever fulcrumed adjacent to the sleeve and adapted to engage the groove therein; a fluid conduit; means adapted to be controlled by pressure in the conduit for moving the lever into engagement with the said groove and an adjustable spring tensioning device tending to retain the lever in its normal position, substantially as described.

3. In a device of the class described the combination of a driving member; a driven member; a shifting clutch whereby they may be put into or out of gear with one another; a sleeve rotatable with the driving member connected to the clutch and having a helical groove therein; a lever fulcrumed adjacent to the sleeve and adapted to engage the groove therein; a fluid conduit; means adapted to be controlled by pressure in the conduit for moving the lever into engagement with the said groove; an adjustable spring tensioning device tending to retain the lever in its normal position and a spring tending to maintain the clutch in gear, substantially as described.

4. In a device of the class described the combination of a driving member; a driven member; a shifting clutch whereby they may be put into or out of gear with one another; a sleeve rotatable with the driving member connected to the clutch and having a helical groove formed therein; a lever fulcrumed adjacent to the sleeve and adapted to engage the groove therein; a fluid conduit; a cylinder communicating with the conduit; a piston therein; a lever of the first order fulcrumed with one end in contact with the piston and the other in engagement with the clutch lever; an adjustable spring tensioning device tending to maintain the levers in their normal position; and a spring tending to maintain the clutch in gear, substantially as described.

5. In a device of the class described the combination of a driving member; a driven member; a clutch whereby they may be put into and out of gear with one another; a sliding sleeve rotatable with the driving member, connected to the clutch and having a helical groove formed therein; a shifter movably supported adjacent to the sleeve, and adapted to engage the groove therein; a fluid conduit; and means controlled by pressure in the conduit for moving the shifter into engagement with the said groove, substantially as described.

6. In a device of the class described, the combination of a driving shaft; a driven member on said shaft; a clutch whereby the driving and driven members may be put into and out of gear with one another; a fluid conduit; means whereby the rotation of said shaft may be utilized to move the clutch out of gear; and means whereby an increase of pressure in the conduit above a predetermined minimum will condition the clutch moving means to operate to throw the clutch out of gear, substantially as described.

London, Ont., 22nd June, 1906.

WILLIAM HENRY HEARD.

Signed in the presence of—
J. W. SWINNETT,
R. E. WALKER.